(12) United States Patent
Kondo et al.

(10) Patent No.: US 12,494,658 B2
(45) Date of Patent: Dec. 9, 2025

(54) POWER SYSTEM

(71) Applicant: HONDA MOTOR CO., LTD., Tokyo (JP)

(72) Inventors: Seiichiro Kondo, Tokyo (JP); Yuta Sato, Tokyo (JP)

(73) Assignee: HONDA MOTOR CO., LTD, Tokyo (JP)

(*) Notice: Subject to any disclaimer, the term of this patent is extended or adjusted under 35 U.S.C. 154(b) by 0 days.

(21) Appl. No.: 18/923,699

(22) Filed: Oct. 23, 2024

(65) Prior Publication Data

US 2025/0132586 A1  Apr. 24, 2025

(51) Int. Cl.
| | |
|---|---|
| *B60L 1/00* | (2006.01) |
| *B60L 53/22* | (2019.01) |
| *H02J 7/00* | (2006.01) |
| *H02J 7/06* | (2006.01) |
| *H02M 1/42* | (2007.01) |

(52) U.S. Cl.
CPC ............ *H02J 7/0068* (2013.01); *B60L 1/006* (2013.01); *B60L 53/22* (2019.02); *H02J 7/00032* (2020.01); *H02J 7/06* (2013.01); *H02M 1/4216* (2013.01); *B60L 2210/10* (2013.01); *B60L 2210/42* (2013.01); *H02J 2207/20* (2020.01)

(58) Field of Classification Search
CPC ........ H02J 7/0068; H02J 7/00032; H02J 7/06; H02J 2207/20; H02J 7/02; H02J 2310/48; H02J 7/0032; H02J 7/345; H02J 2207/50; B60L 1/006; B60L 53/22; B60L 2210/10; B60L 2210/42; B60L 2210/30; B60L 53/20; B60L 1/00; B60L 50/60; B60L 58/10; H02M 1/4216; H02M 1/0095; H02M 5/4585; H02M 1/10; H02M 7/23
USPC ....... 320/109, 107, 103, 137, 108, 134, 166, 320/128, 162, 104, 101; 307/9.1, 10.1, 307/104, 66; 701/22
See application file for complete search history.

(56) References Cited

U.S. PATENT DOCUMENTS

| | | | |
|---|---|---|---|
| 2014/0319909 A1* | 10/2014 | Suzuki | ............ B60L 50/66 307/10.1 |
| 2023/0336087 A1* | 10/2023 | Kitazawa | ............ B60L 58/00 |

FOREIGN PATENT DOCUMENTS

JP  5578209 B2  8/2014

* cited by examiner

*Primary Examiner* — Elim Ortiz
(74) *Attorney, Agent, or Firm* — CKC & PARTNERS CO., LLC

(57) ABSTRACT

A power system 1 includes a power converter 6 and a control device 8. The power converter 6 includes a first converter circuit 71 including switching legs 61, 64 and a second converter circuit 72 including switching legs 62, 63. The control device 8 operates the power converter 6 under any one control mode among a charging mode for charging a high-voltage battery B by causing the converter circuits 71, 72 to operate as a PFC converter, a power feeding mode for feeding power to an external AC load EL by causing the second converter circuit 72 to operate as an inverter, and a power feeding during charging mode for feeding power to the external AC load EL while charging the high-voltage battery B by causing the first converter circuit 71 to operate as the PFC converter and causing the second converter circuit 72 to operate as the inverter.

9 Claims, 11 Drawing Sheets

POWER SYSTEM

This application is based on and claims the benefit of priority from Japanese Patent Application No. 2023-182544, filed on 24 Oct. 2023, the content of which is incorporated herein by reference.

BACKGROUND OF THE INVENTION

Field of the Invention

The present invention relates to a power system. More specifically, the present invention relates to a power system that can simultaneously perform charging to an electrical storage device with an external power supply connected to an inlet and power feeding to an external load connected to an outlet.

Related Art

In recent years, in order to enable more people to secure access to reasonable, reliable, sustainable, and advanced energy, research and development has been conducted into charging and power feeding in mobility vehicles equipped with secondary batteries that contribute to energy efficiency.

Patent Document 1 discloses a vehicle power control device including a storage battery mounted on a vehicle, a charging terminal connectable to an external AC power supply, a charging device that converts AC power input from the charging terminal into DC power to charge the storage battery, a discharge terminal to which an external AC load is connectable, and a power feeding device that converts the DC power from the storage battery into AC power and outputs the AC power from the discharge terminal.

Patent Document 1: Japanese Patent No. 5578209

SUMMARY OF THE INVENTION

With the vehicle power control device disclosed in Patent Document 1, it is possible to feed power to the AC load while charging the storage battery by connecting the external AC power and the external AC load respectively to the charging terminal and the discharge terminal. Therefore, it is possible to improve convenience of a user. However, in order to perform such power feeding during charging, two units of the charging device and the power feeding device need to be mounted on the vehicle. Therefore, it is likely that cost increases.

An object of the present invention is to provide a power system that can perform charging and power feeding using a common unit. The present invention contributes to energy efficiency.

(1) A power system (for example, a power system 1 explained below) according to the present invention includes: a voltage converter (for example, a DC-DC converter 3 explained below) connected to an electrical storage device (for example, a high-voltage battery B explained below); a power converter (for example, a power converter 6 explained below) connected to an inlet (for example, an inlet 4 explained below) and an outlet (for example, an outlet 5 explained below); a capacitor (for example, a bulk capacitor 23 explained below) included in a power line (for example, power lines 21 and 22 explained below) that connects the voltage converter and the power converter; and a control device (for example, a control device 8 explained below) configured to operate the voltage converter and the power converter. The power converter includes: a first converter circuit (for example, a first converter circuit 71 explained below) including two or more switching legs (for example, switching legs 61 and 64 explained below) connected to the power line; a second converter circuit (for example, a second converter circuit 72 explained below) including one or more switching legs (for example, switching legs 62 and 63 explained below) connected to the power line to be parallel to the first converter circuit; and a switch circuit (a switch circuit 65 explained below) that is switchable between a first connection state in which both of the first and second converter circuits are connected to the inlet and a second connection state in which the first and second converter circuits are respectively connected to the inlet and the outlet. The control device operates the voltage converter and the power converter under any one control mode among a charging mode for charging the electrical storage device with an external power supply connected to the inlet by switching the switch circuit to the first connection state and causing the first and second converter circuits to operate as a PFC converter including the inlet on an input side, a power feeding mode for feeding power to an external load connected to the outlet by switching the switch circuit to the second connection state and causing the second converter circuit to operate as an inverter including the capacitor on the input side, and a power feeding during charging mode for feeding power to the external load while charging the electrical storage device by switching the switch circuit to the second connection state and causing the first converter circuit to operate as the PFC converter and causing the second converter circuit to operate as the inverter.

(2) In this case, it is preferable that the power system further includes: an operation state information acquirer (for example, an operation state information acquirer 82 explained below) configured to acquire operation state information of the first and second converter circuits; a request acquirer (for example, a charging/power feeding request acquirer 81 explained below) configured to acquire a request for charging by the external power supply or power feeding to the external load; and a control mode determiner (for example, a control mode determiner 83 explained below) configured to, when the request is acquired, determine the control mode based on the operation state information and a type of the request.

(3) In this case, it is preferable that, under the power feeding during charging mode, the control device controls a voltage of the capacitor by causing the first converter circuit to operate as the PFC converter.

(4) In this case, it is preferable that, under the charging mode, the control device controls the voltage of the capacitor by causing the first and second converter circuits to operate as the PFC converter.

(5) In this case, it is preferable that the power system further includes a request acquirer (for example, the charging/power feeding request acquirer 81 explained below) configured to acquire a request for starting power feeding to the external load or a request for starting charging by the external power supply, and, when the request for starting power feeding is acquired during a period in which the electrical storage device is being charged, the control device shifts the control mode from the charging mode to the power feeding during charging mode by starting to cause the second converter circuit to operate as the inverter while continuously causing the first converter circuit to operate as the PFC converter.

(6) In this case, it is preferable that the power system further includes a request acquirer (for example, the charging/power feeding request acquirer 81 explained below) configured to acquire a request for stopping power feeding to the external load or a request for stopping charging by the external power supply, and, when the request for stopping power feeding is acquired during a period in which power is being fed to the external load while the electrical storage device is being charged, the control device shifts the control mode from the power feeding during charging mode to the charging mode by starting to cause the second converter circuit to operate as the PFC converter while continuously causing the first converter circuit to operate as the PFC converter.

(7) In this case, it is preferable that, under the power feeding mode, the control device controls a voltage of the capacitor by operating the voltage converter and converts DC power in the capacitor into AC power by causing the second converter circuit to operate as the inverter and supplies the AC power to the external load.

(8) In this case, it is preferable that the power system further includes a request acquirer (for example, the charging/power feeding request acquirer 81 explained below) configured to acquire a request for starting power feeding to the external load and a request for starting charging by the external power supply, and, when the request for starting charging is acquired during a period in which power is being fed to the external load, the control device shifts the control mode from the power feeding mode to the power feeding during charging mode by starting to cause the first converter circuit to operate as the PFC converter while continuously causing the second converter circuit to operate as the inverter.

(9) In this case, it is preferable that the power system further includes a request acquirer (for example, the charging/power feeding request acquirer 81) configured to acquire a request for stopping power feeding to the external load or a request for stopping charging by the external power supply, and, when the request for stopping charging is acquired during a period in which power is being fed to the external load while the electrical storage device is being charged, the control device shifts the control mode from the power feeding during charging mode to the power feeding mode by stopping an operation of the first converter circuit while continuously causing the second converter circuit to operate as the inverter.

(1) The power converter of the power system according to the present invention includes the first converter circuit including the two or more switching legs, the second converter circuit including the one or more switching legs, and the switch circuit capable of switching the connection state between the first and second converter circuits and the inlet and the outlet. Under the charging mode, the control device connects both of the first and second converter circuits to the inlet by switching the switch circuit to the first connection state and charges the electrical storage device with the external power supply connected to the outlet by causing the first and second converter circuits to operate as the PFC converter including the inlet on the input side. Under the power feeding mode, the control device connects the first and second converter circuits respectively to the inlet and the outlet by switching the switch circuit to the second connection state and feeds power to the external load connected to the inlet by causing the second converter circuit to operate as the inverter including the capacitor on the input side. Under the power feeding during charging mode, the control device can feed power to the external load while charging the electrical storage device by switching the switch circuit to the second connection state and causing the first converter circuit to operate as the PFC converter and causing the second converter circuit to operate as the inverter. As explained above, according to the present invention, at the time of power feeding and the time of power feeding during charging, only the second converter circuit of the first and second converter circuits caused to operate as the PFC converter at the time of charging is caused to operate as the inverter. Thus, according to the present invention, it is possible to perform charging, power feeding, and power feeding during charging using a common power converter. Therefore, compared with when charging and power feeding are respectively performed using separate units, it is possible to reduce cost and contribute to energy efficiency.

(2) According to the present invention, when a request for charging by the external power supply or power feeding to the external load is acquired, the control mode by the control device is determined based on the operation state information of the first and second converter circuits and a type of the acquired request. Thus, according to the present invention, it is possible to shift to an appropriate control mode corresponding to an operation state of the first and second converter circuits at the time when the request is acquired. Therefore, it is possible to shift to a new control mode while continuing a charging operation and a power feeding operation performed before the request is acquired.

(3) According to the present invention, under the power feeding during charging mode, by controlling the voltage of the capacitor by causing the first converter circuit to operate as the PFC converter, the control device can maintain the voltage of the capacitor at a voltage decided in order to simultaneously perform charging to the electrical storage device and power feeding to the external load.

(4) According to the present invention, under the charging mode, by controlling the voltage of the capacitor by causing the first and second converter circuits to operate as the PFC converter, the control device can maintain the voltage of the capacitor at a voltage decided in order to perform the charging to the electrical storage device. According to the present invention, by causing both of the first and second converter circuits to operate as the PFC converter, it is possible to charge the electrical storage device at higher efficiency in a high load region than when only the first converter circuit is caused to operate as the PFC converter.

(5) According to the present invention, when the request for starting power feeding is acquired during a period in which the electrical storage device is being charged, while continuously causing the first converter circuit to operate as the PFC converter, the control device shifts the control mode from the charging mode to the power feeding during charging mode by starting to cause the second converter circuit, which has been caused to operate as the PFC converter, to operate as the inverter.

Accordingly, it is possible to start the power feeding to the external load without dropping a charging current to the electrical storage device to zero.

(6) According to the present invention, when the request for stopping power feeding is acquired during a period in which power is being fed to the external load while the electrical storage device is being charged, while continuously causing the first converter circuit to operate as the PFC converter, the control device shifts the control mode from the power feeding during charging mode to the charging mode by starting to cause the second converter circuit, which has been caused to operate as the inverter, to operate as the PFC converter. Accordingly, it is possible to stop the power feeding to the external load without dropping the charging current to the electrical storage device to zero.

(7) According to the present invention, under the power feeding mode, the control device controls the voltage of the capacitor by operating the voltage converter and converts DC power in the capacitor into AC power by causing the second converter circuit to operate as the inverter and supplies the AC power to the external load. Thus, according to the present invention, it is possible to maintain the voltage of the capacitor at a voltage decided in order to perform power feeding to the external load.

(8) According to the present invention, when the request for starting charging is acquired during a period in which power is being fed to the external load, while continuously causing the second converter circuit to operate as the inverter, the control device shifts the control mode from the power feeding mode to the power feeding during charging mode by starting to cause the first converter circuit, which has stopped operation, to operate as the PFC converter. Accordingly, it is possible to start charging to the electrical storage device while continuing supply of electric power to the external load.

(9) According to the present invention, when the request for stopping charging is acquired during a period in which power is being fed to the external load while the electrical storage device is being charged, while continuously causing the second converter circuit to operate as the inverter, the control device shifts the control mode from the power feeding during charging mode to the power feeding mode by stopping operation of the first converter circuit, which has been caused to operate as the PFC converter. Accordingly, it is possible to stop charging to the electrical storage device while continuing supply of electric power to the external load.

DETAILED DESCRIPTION OF THE INVENTION

A power system according to an embodiment of the present invention is explained below with reference to the drawings.

Figure 1:
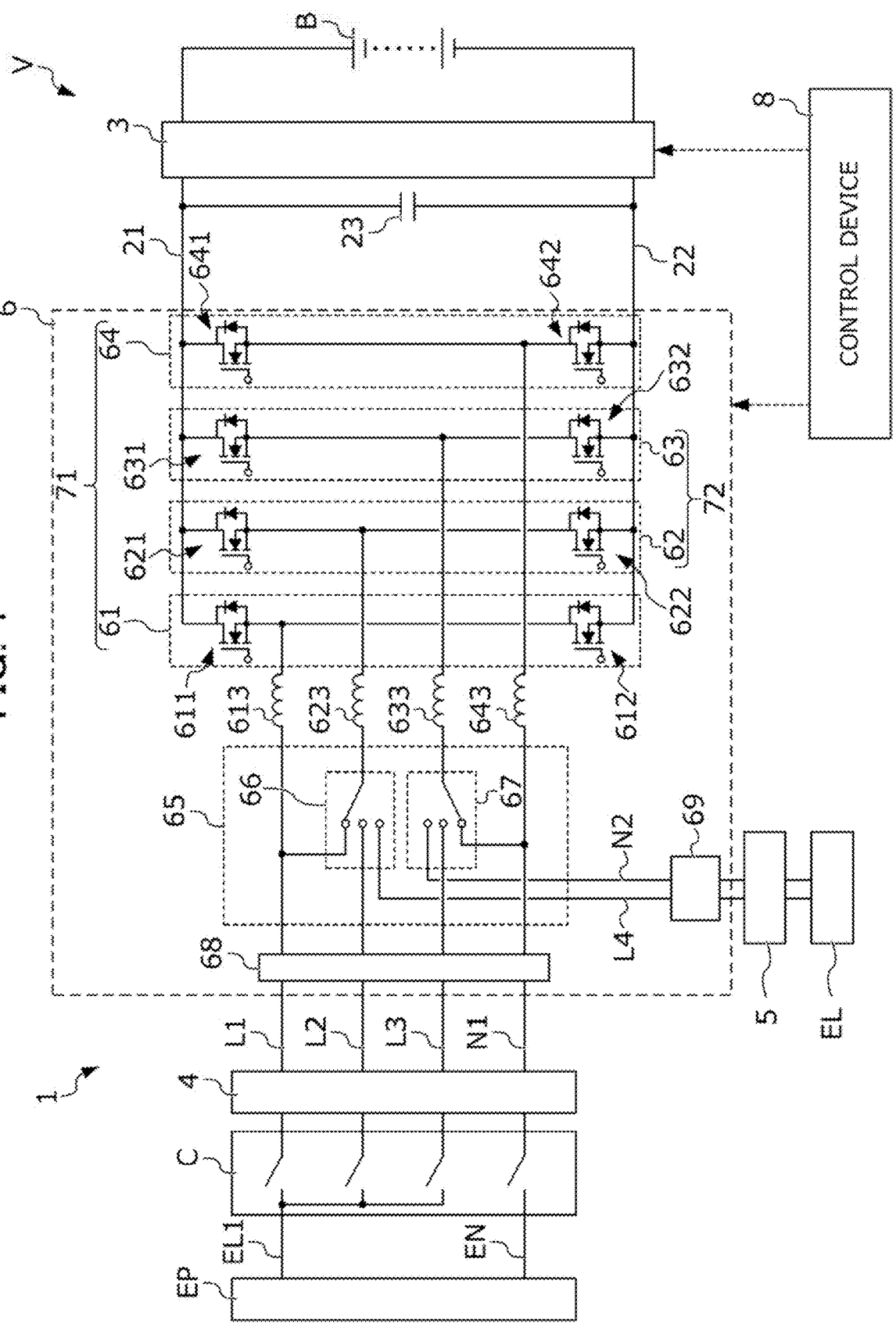
FIG. 1 is a diagram illustrating a configuration of a motor-driven vehicle equipped with a power system according to an embodiment of the present invention.

FIG. 1 is a diagram illustrating configurations of a power system 1 according to the present embodiment and a motor-driven vehicle V (hereinafter simply referred to as "vehicle") equipped with the power system 1. Note that, in the present embodiment, as the vehicle V, an electric automobile that travels by supplying electric power stored in a high-voltage battery B explained below to a driving motor (not illustrated) and rotating driving wheels (not illustrated) is explained as an example. However, the present invention is not limited to this. The power system according to the present invention is applicable to not only the electric automobile but also any vehicle if the vehicle is a motor-driven vehicle that travels using electric power stored in the high-voltage battery B such as a hybrid vehicle or a fuel cell automobile. The power system according to the present invention may be mounted on not only a motor-driven vehicle explained above but also a mobile body such as an electric motorcycle or a motor-driven vertical take-off and landing aircraft (eVTOL).

The power system 1 includes the high-voltage battery B serving as an electrical storage device, a DC-DC converter 3 connected to the high-voltage battery B, an inlet 4 to which an external AC power supply EP is connectable, an outlet 5 to which an external AC load EL is connectable, a power converter 6 connected to the inlet 4 and the outlet 5, a pair of power lines 21 and 22 that connects the DC-DC converter 3 and the power converter 6, a bulk capacitor 23 connected between the DC-DC converter 3 and the power converter 6 in the power lines 21 and 22, and a control device 8 that operates the DC-DC converter 3 and the power converter 6.

The inlet 4 is connected to a switch circuit 65 explained below of the power converter 6 via four power lines L1, L2, L3, and N1. The outlet 5 is connected to the switch circuit 65 of the power converter 6 via two power lines L4 and N2.

As illustrated in FIG. 1, when the external AC power supply EP of a single-phase two-line type and the inlet 4 are connected via a charging cable C, a voltage line EL1 and a neutral line EN of the external AC power supply EP are respectively connected to power the lines L1 and N1 extending from the inlet 4. Accordingly, it is possible to supply single-phase AC power from the external AC power supply EP to the power converter 6 via the power lines L1 and N1. When the external AC load EL of the single-phase two-line type is connected to the outlet 5, the external AC load EL is connected to the power lines L4 and N2 extending from the outlet 5. Accordingly, it is possible to supply single-phase AC power from the power converter 6 to the external AC load EL via the power lines L4 and N2.

Figure 2:
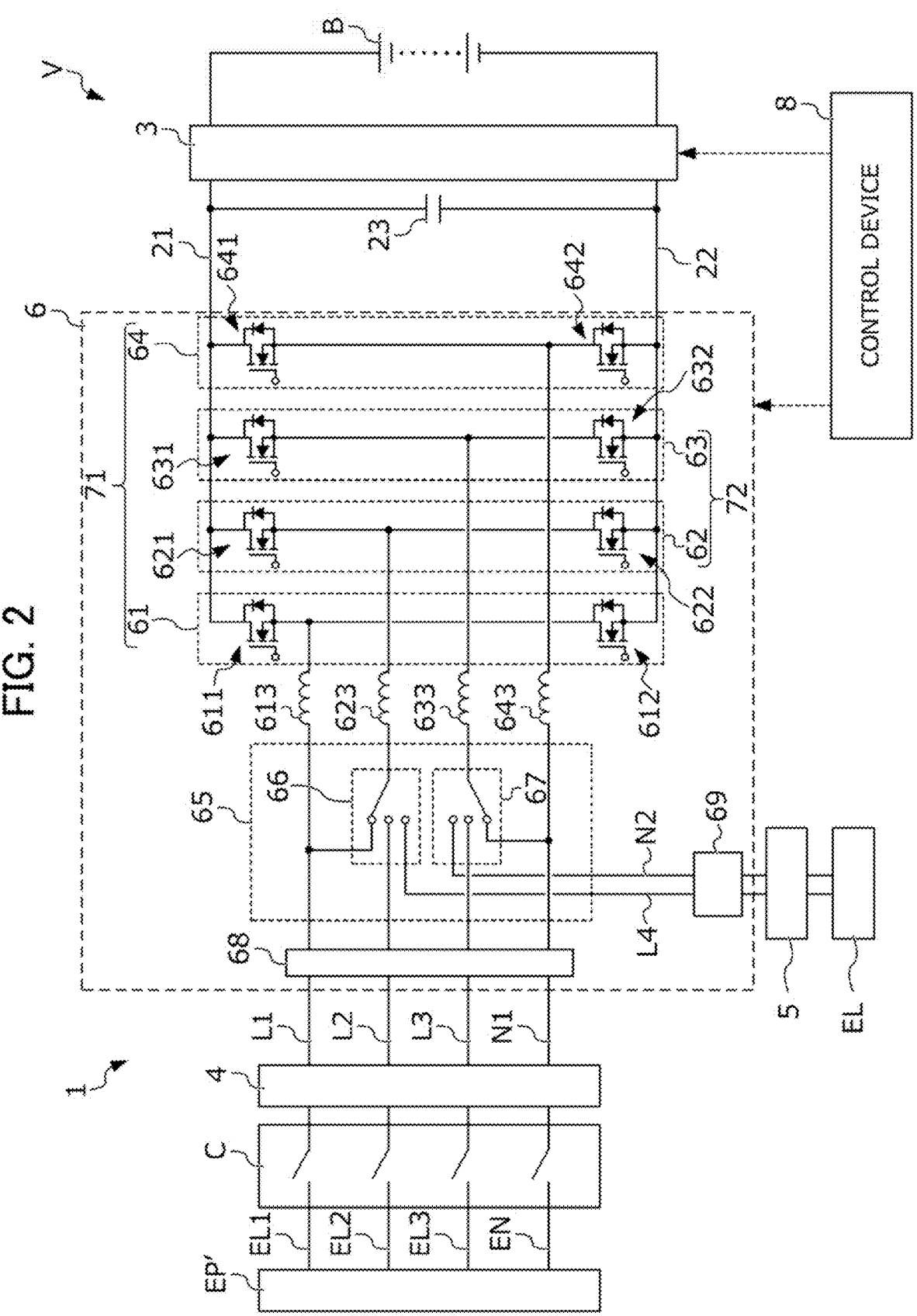
FIG. 2 is a diagram illustrating a configuration of the power system to which an external AC power supply of a three-phase four-line type is connected.

Note that, in the following explanation, a case in which the external AC power supply EP of the single-phase two-line type and the inlet 4 are mainly connected as illustrated in FIG. 1 is explained. However, the present invention is not limited to this. As illustrated in FIG. 2, an external AC power supply EP' of a three-phase four-line type and the inlet 4 can also be connected via the charging cable C. In this case, three voltage lines EL1, EL2, and EL3 and the neutral line EN of the external AC power supply EP' are respectively connected to the power lines L1, L2, L3, and N1 extending from the inlet 4. Accordingly, it is possible to supply three-phase AC power from the external AC power supply EP' to the power converter 6 via the power lines L1, L2, L3, and N1. Even when the external AC power supply EP' of the three-phase four-line type and the inlet 4 are connected, by using only two power lines L1 and N1, it is possible to supply single-phase AC power from the external AC power supply EP' to the power converter 6.

Referring back to FIG. 1, the high-voltage battery B is a secondary battery capable of performing both of discharging for converting chemical energy into electric energy and charging for converting electric energy into chemical energy. In the following explanation, a case in which a so-called lithium ion storage battery that performs charging and discharging when lithium ions move between electrodes is used as the high-voltage battery B is explained. However, the present invention is not limited to this.

One end of the DC-DC converter 3 is connected to the bulk capacitor 23 and the other end of the DC-DC converter 3 is connected to the high-voltage battery B. The DC-DC converter 3 boosts and steps down DC power between the bulk capacitor 23 and the high-voltage battery B. The DC-DC converter 3 turns on and off a not-illustrated switching element according to a gate driving signal transmitted from the control device 8 to thereby boost and step down DC power in the bulk capacitor 23 and output the DC power to the high-voltage battery B or boost and step down DC power in the high-voltage battery B and output the DC power to the bulk capacitor 23.

The power converter 6 includes four switching legs 61, 62, 63, and 64, both ends of which are respectively connected to the power lines 21 and 22 to be parallel to the bulk capacitor 23, a switch circuit 65 that connects the switching legs 61 to 64 and the inlet 4 and the outlet 5, a first EMI filter 68 that removes noise in the power lines L1, L2, L3, and N1 that connect the inlet 4 and the switch circuit 65, and a second EMI filter 69 that removes noise in the power lines L4 and N2 that connect the outlet 5 and the switch circuit 65.

A first switching leg 61 includes a first upper arm switching element 611, a first lower arm switching element 612, and a first choke coil 613.

The switching elements 611 and 612 include known power switching elements such as MOSFETs or IGBTs turned on and off according to a gate driving signal transmitted from the control device 8 and diodes connected in parallel to the power switching elements. The first upper arm switching element 611 and the first lower arm switching element 612 are connected in series. A drain of the first upper arm switching element 611 is connected to a positive electrode side power line 21. A source of the first upper arm switching element 611 is connected to a drain of the first lower arm switching element 612. A source of the first lower arm switching element 612 is connected to a negative electrode side power line 22. One end of the first choke coil 613 is connected to a connection point of the first upper arm switching element 611 and the first lower arm switching element 612 and the other end of the first choke coil 613 is connected to the switch circuit 65.

A second switching leg 62 includes a second upper arm switching element 621, a second lower arm switching element 622, and a second choke coil 623.

The switching elements 621 and 622 include known power switching elements such as MOSFETs or IGBTs turned on and off according to a gate driving signal transmitted from the control device 8 and diodes connected in parallel to the power switching elements. The second upper arm switching element 621 and the second lower arm switching element 622 are connected in series. A drain of the second upper arm switching element 621 is connected to the positive electrode side power line 21. A source of the second upper arm switching element 621 is connected to a drain of the second lower arm switching element 622. A source of the second lower arm switching element 622 is connected to the negative electrode side power line 22. One end of the second choke coil 623 is connected to a connection point of the second upper arm switching element 621 and the second lower arm switching element 622 and the other end of the second choke coil 623 is connected to the switch circuit 65.

A third switching leg 63 includes a third upper arm switching element 631, a third lower arm switching element 632, and a third choke coil 633.

The switching elements 631 and 632 include known power switching elements such as MOSFETs or IGBTs turned on and off according to a gate driving signal transmitted from the control device 8 and diodes connected in parallel to the power switching elements. The third upper arm switching element 631 and the third lower arm switching element 632 are connected in series. A drain of the third upper arm switching element 631 is connected to the positive electrode side power line 21. A source of the third upper arm switching element 631 is connected to a drain of the third lower arm switching element 632. A source of the third lower arm switching element 632 is connected to the negative electrode side power line 22. One end of the third choke coil 633 is connected to a connection point of the third upper arm switching element 631 and the third lower arm switching element 632 and the other end of the third choke coil 633 is connected to the switch circuit 65.

A fourth switching leg 64 includes a fourth upper arm switching element 641, a fourth lower arm switching element 642, and a fourth choke coil 643.

The switching elements 641 and 642 include known power switching elements such as MOSFETs or IGBTs turned on and off according to a gate driving signal transmitted from the control device 8 and diodes connected in parallel to the power switching elements. The fourth upper arm switching element 641 and the fourth lower arm switching element 642 are connected in series. A drain of the fourth upper arm switching element 641 is connected to the positive electrode side power line 21. A source of the fourth upper arm switching element 641 is connected to a drain of the fourth lower arm switching element 642. A source of the fourth lower arm switching element 642 is connected to the negative electrode side power line 22. One end of the fourth choke coil 643 is connected to a connection point of the fourth upper arm switching element 641 and the fourth lower arm switching element 642 and the other end of the fourth choke coil 643 is connected to the switch circuit 65.

Note that, in the following explanation, a circuit obtained by combining two first and fourth switching legs 61 and 64 connected to the power lines 21 and 22 to be parallel to the bulk capacitor 23 is referred to as first converter circuit 71. A circuit obtained by combining two second and third switching legs 62 and 63 connected to the power lines 21 and 22 to be parallel to the first converter circuit 71 is referred to as second converter circuit 72. In the following explanation, the first and second converter circuits 71 and 72 operating as a PFC converter under the charging mode explained below are collectively referred to as "full PFC circuit" as well. The first converter circuit 71 operating as the PFC converter under the power feeding during charging mode explained below is referred to as "half PFC circuit" as well, meaning the half of the full PFC circuit described above.

The switch circuit 65 is a circuit connecting the choke coils 613, 623, 633, and 643, which are input and output ends of the four switching legs 61, 62, 63, and 64 and six power lines L1, L2, L3, L4, N1, and N2 in total. The switch circuit 65 includes a first relay 66 and a second relay 67 that operate according to an instruction signal from the control device 8.

As illustrated in FIG. 1, the switch circuit 65 always connects the first choke coil 613 of the first switching leg 61 and the power line L1 connected to the inlet 4 and always connects the fourth choke coil 643 of the fourth switching leg 64 and the power line N1 connected to the inlet 4.

The first relay 66 is capable of switching, according to an instruction signal from the control device 8, the second choke coil 623 of the second switching leg 62 to three states in total, that is, a state in which the second choke coil 623 is connected to the power line L1 extending from the inlet 4, a state in which the second choke coil 623 is connected to the power line L2 extending from the inlet 4, and a state in which the second choke coil 623 is connected to the power line L4 extending from the outlet 5.

The second relay 67 is capable of switching, according to an instruction signal from the control device 8, the third choke coil 633 of the third switching leg 63 to three states in total, that is, a state in which the third choke coil 633 is connected to the power line N1 extending from the inlet 4, a state in which the third choke coil 633 is connected to the power line L3 extending from the inlet 4, and a state in which the third choke coil 633 is connected to the power line N2 extending from the outlet 5.

The switch circuit 65 is capable of implementing nine connection states in total because the switch circuit 65 is configured by combining two three-state type relays 66 and 67 explained above.

Note that, in the following explanation, a state in which the second choke coil 623 of the second switching leg 62 and the power line L1 extending from the inlet 4 are connected by the first relay 66 and the third choke coil 633 of the third switching leg 63 and the power line N1 extending from the inlet 4 are connected by the second relay 67, that is, a state in which both of the first converter circuit 71 and the second converter circuit 72 are connected to the inlet 4 is referred to as a first connection state. More specifically, in the first connection state, the first choke coil 613 of the first switching leg 61 and the second choke coil 623 of the second switching leg 62 are connected to the common power line L1 and the third choke coil 633 of the third switching leg 63 and the fourth choke coil 643 of the fourth switching leg 64 are connected to the common power line N1.

A state in which the second choke coil 623 of the second switching leg 62 and the power line L4 extending from the outlet 5 are connected by the first relay 66 and the third choke coil 633 of the third switching leg 63 and the power line N2 extending from the outlet 5 are connected by the second relay 67, that is, a state in which the first converter circuit 71 and the second converter circuit 72 are respectively connected to the inlet 4 and the outlet 5 is referred to as a second connection state.

A state in which the second choke coil 623 of the second switching leg 62 and the power line L2 extending from the inlet 4 are connected by the first relay 66 and the third choke coil 633 of the third switching leg 63 and the power line L3 extending from the inlet 4 are connected by the second relay 67 is referred to as a third connection state.

As explained above, in the present embodiment, the switch circuit 65 is configured by combining the two relays 66 and 67 capable of switching the three states. However, the present invention is not limited to this. The switch circuit 65 may use not only the three-state type relays 66 and 67 but also a known switching unit such as a two-state type relay or switch if the switching unit is capable of implementing a plurality of connection states like the connection states explained above.

Figure 3:
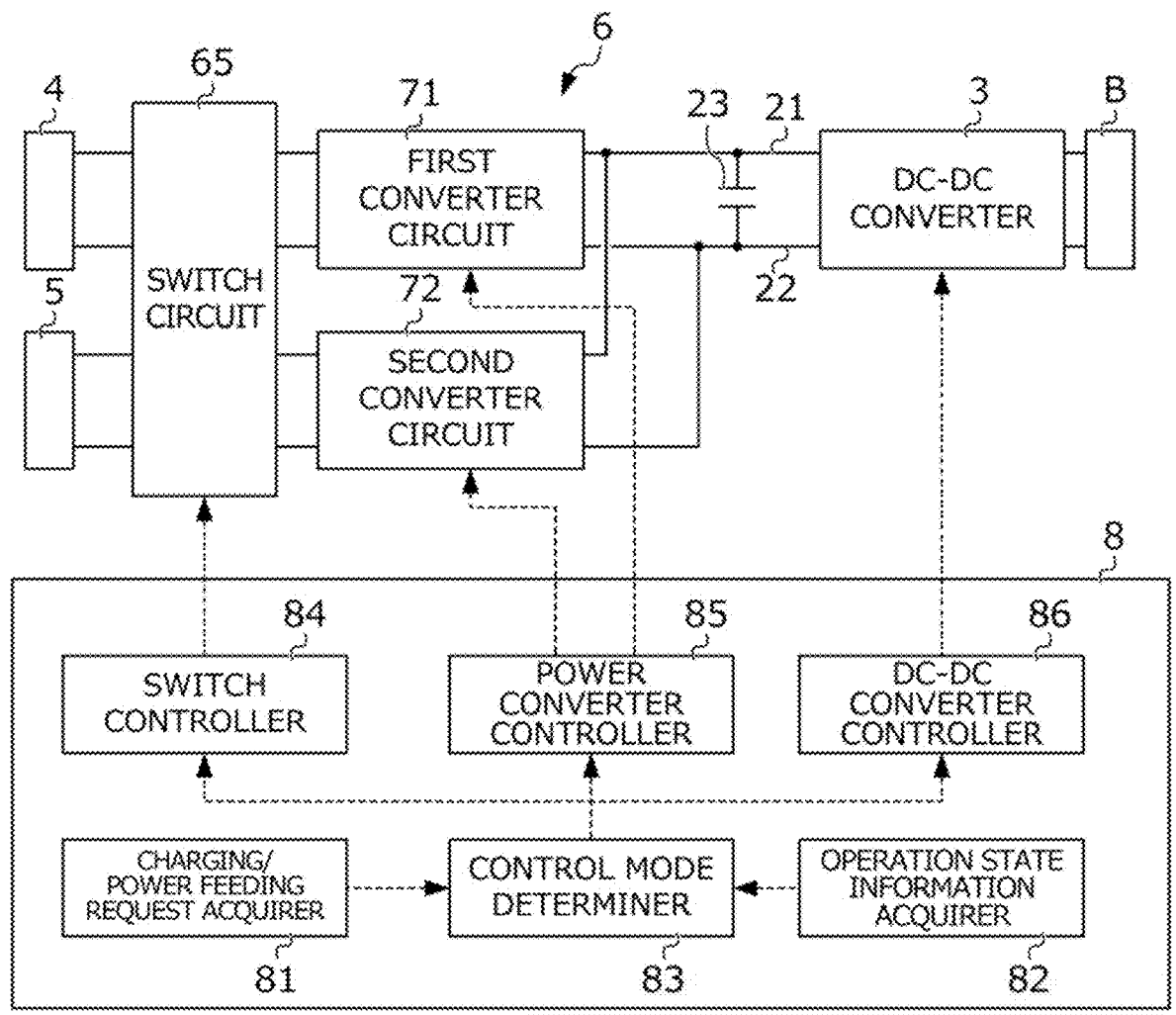
FIG. 3 is a functional block diagram of a control device.

FIG. 3 is a functional block diagram of the control device 8 that operates the DC-DC converter 3 and the power converter 6 explained above.

The control device 8 includes a charging/power feeding request acquirer 81 that acquires a request for charging by the external AC power supply EP or power feeding to the external AC load EL, an operation state information acquirer 82 that acquires operation state information concerning an operation state of the power converter 6 and the DC-DC converter 3, a control mode determiner 83 that determines a control mode for the power converter 6 and the DC-DC converter 3 by the control device 8, a switch controller 84 that operates the switch circuit 65 of the power converter 6 in a mode decided by the determined control mode, a power converter controller 85 that operates the converter circuits 71 and 72 of the power converter 6 in the mode decided by the determined control mode, and a DC-DC converter controller 86 that operates the DC-DC converter 3 in the mode decided by the determined control mode.

As explained below with reference to FIGS. 4A and 4C, in a state in which the external AC power supply EP and the inlet 4 are connected, the power system 1 is capable of charging a high-voltage battery B with AC power supplied from the external AC power supply EP. As explained below with reference to FIGS. 4B and 4C, in a state in which the external AC load EL is connected to the outlet 5, the power system 1 is capable of feeding power to the external AC load EL using DC power in the bulk capacitor 23.

Therefore, the charging/power feeding request acquirer 81 acquires a request for charging by the external AC power supply EP or power feeding to the external AC load EL. In the following explanation, a request for a start of charging by the external AC power supply EP is referred to as a request for starting charging and a request for a stop of charging by the external AC power supply EP is referred to as request for stopping charging. A request for a start of power feeding to the external AC load EL is referred to as a request for starting power feeding and a request for a stop of power feeding to the external AC load EL is referred to as a request for stopping power feeding.

The charging/power feeding request acquirer 81 acquires the request for starting charging at the opportunity when, for example, the external AC power supply EP and the inlet 4 have been connected via the charging cable C based on operation by the user. After the charging by the external AC power supply EP is started, the charging/power feeding request acquirer 81 acquires the request for stopping charging at the opportunity when, for example, the remaining power of the high-voltage battery B has exceeded a predetermined amount or predetermined charging stop operation by the user has been detected.

The charging/power feeding request acquirer 81 acquires the request for starting power feeding at the opportunity when, for example, the external AC load EL and the outlet 5 have been connected and predetermined power feeding start operation for a power feeding interface (for example, a power feeding interface switch mounted on a vehicle or a smartphone carried by the user) by the user has been detected. The charging/power feeding request acquirer 81 acquires the request for stopping power feeding at the opportunity when, after the power feeding to the external AC load EL was started, for example, predetermined power feeding stop operation for the power feeding interface by the user has been detected.

The control mode determiner 83 determines a control mode of the power converter 6 and the DC-DC converter 3 by the controllers 84 to 86 explained below. As explained below with reference to FIGS. 4A to 4C, the controllers 84 to 86 are capable of operating the power converter 6 and the DC-DC converter 3 under any one control mode among three kinds of control modes including a charging mode (see FIG. 4A), a power feeding mode (see FIG. 4B), and a power feeding during charging mode (see FIG. 4C) in which flows of electric power in the power converter 6 and the DC-DC converter 3 are different.

Figure 4A:
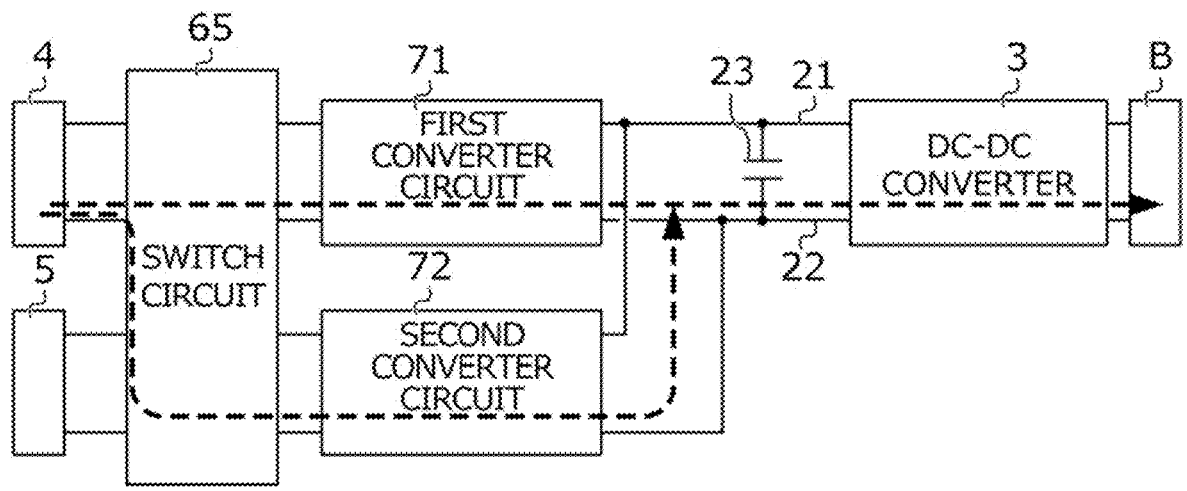
FIG. 4A is a diagram schematically illustrating a flow of electric power in a charging mode.

FIG. 4A is a diagram schematically illustrating, with a broken line arrow, a flow of electric power at the time when the controllers 84 to 86 operate the power converter 6 and the DC-DC converter 3 under the charging mode.

Under the charging mode, the switch controller 84 operates the relays 66 and 67 of the switch circuit 65 and switches the switch circuit 65 to the first connection state. Accordingly, both of the first converter circuit 71 and the second converter circuit 72 are connected to the power lines L1 and N1 of the inlet 4.

In order to implement the flow of the electric power illustrated in FIG. 4A and charge the high-voltage battery B with the electric power supplied from the external AC power supply EP, the power converter controller 85 operates the power converter 6 to thereby perform bulk voltage control for controlling a bulk voltage, which is a voltage of the bulk capacitor 23, to a predetermined target voltage and, at the same time, the DC-DC converter controller 86 operates the DC-DC converter 3 to thereby perform charging current control for controlling a charging current supplied to the high-voltage battery B to a predetermined target current.

More specifically, under the charging mode, the power converter controller 85 causes the full PFC circuit configured by the first converter circuit 71 and the second converter circuit 72 to operate as a PFC converter including the inlet 4 on an input side. More specifically, under the charging mode, the power converter controller 85 operates the full PFC circuit to operate as a PFC converter including the inlet 4 on an AC input side and including the bulk capacitor 23 on a DC output side. That is, the power converter controller 85 operates the full PFC circuit such that AC power input from the external AC power supply EP connected to the inlet 4 is converted into DC power in the full PFC circuit and a power factor approaches one. At this time, the power converter controller 85 causes the full PFC circuit to operate as the PFC converter to thereby perform bulk voltage control for maintaining the voltage of the bulk capacitor 23 at a target voltage when charging decided by not-illustrated processing.

Under the charging mode, the DC-DC converter controller 86 operates the DC-DC converter 3 such that DC power in the bulk capacitor 23 is supplied to the high-voltage battery B. At this time, the DC-DC converter controller 86 operates the DC-DC converter 3 to thereby perform charging current control for maintaining a charging current supplied to the high-voltage battery B at a target charging current decided by not-illustrated processing.

Under the charging mode, the controllers 84 to 86 operate the power converter 6 and the DC-DC converter 3 as explained above to thereby charge the high-voltage battery B with AC power supplied from the external AC power supply EP connected to the inlet 4.

Figure 4B:
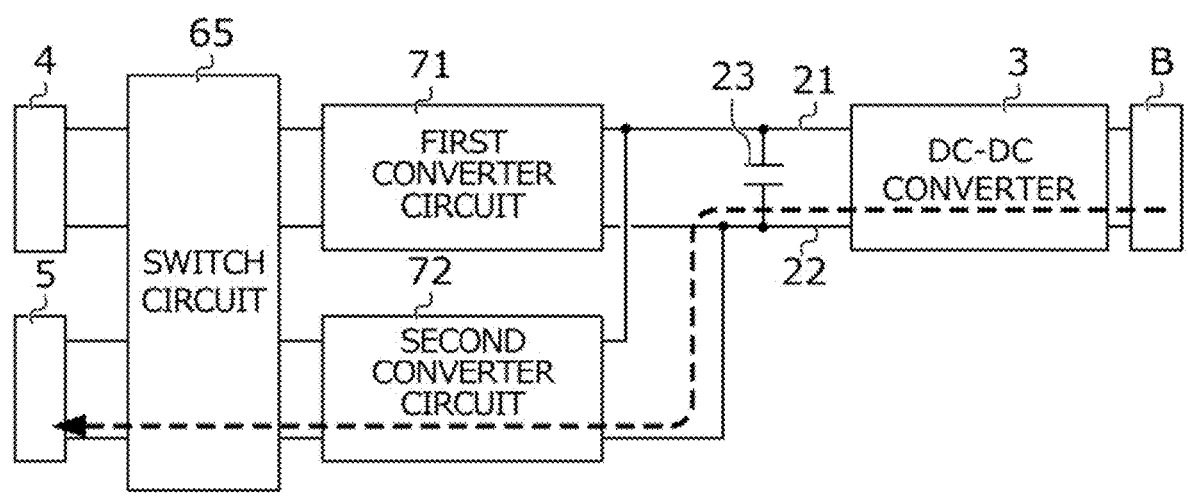
FIG. 4B is a diagram schematically illustrating a flow of electric power in a power feeding mode.

FIG. 4B is a diagram schematically illustrating, with a broken line arrow, a flow of electric power at the time when the controllers 84 to 86 operate the power converter 6 and the DC-DC converter 3 under the power feeding mode.

Under the power feeding mode, the switch controller 84 operates the relays 66 and 67 of the switch circuit 65 and switches the switch circuit 65 to the second connection state. Accordingly, the second converter circuit 72 is connected to the power lines L4 and N2 of the outlet 5.

In order to implement the flow of the electric power illustrated in FIG. 4B and feed power to the external AC load EL with the electric power of the high-voltage battery B, the DC-DC converter controller 86 operates the DC-DC converter 3 to thereby perform bulk voltage control for controlling the bulk voltage to a predetermined target voltage, and, at the same time, the power converter controller 85 operates the power converter 6 to thereby perform power feeding current control for controlling a power feeding current supplied to the external AC load EL to a predetermined target current.

More specifically, under the power feeding mode, the DC-DC converter controller 86 operates the DC-DC converter 3 such that the DC power in the high-voltage battery B is supplied to the bulk capacitor 23. At this time, the DC-DC converter controller 86 operates the DC-DC converter 3 to thereby perform bulk voltage control for maintaining the bulk voltage at a target voltage when power feeding decided by not-illustrated processing.

Under the power feeding mode, the power converter controller 85 causes the second converter circuit 72 to operate as an inverter including the bulk capacitor 23 on an input side to thereby convert the DC power in the bulk capacitor 23 into AC power and supply the AC power to the external AC load EL. More specifically, under the power feeding mode, the power converter controller 85 causes the second converter circuit 72 to operate as the inverter including the bulk capacitor 23 on a DC input side and including the outlet 5 on an AC output side to thereby perform power feeding current control for the external AC load EL.

Under the power feeding mode, the controllers 84 to 86 operate the power converter 6 and the DC-DC converter 3 as explained above to thereby convert the DC power supplied from the high-voltage battery B into AC power and feed power to the external AC load EL connected to the outlet 5.

Figure 4C:
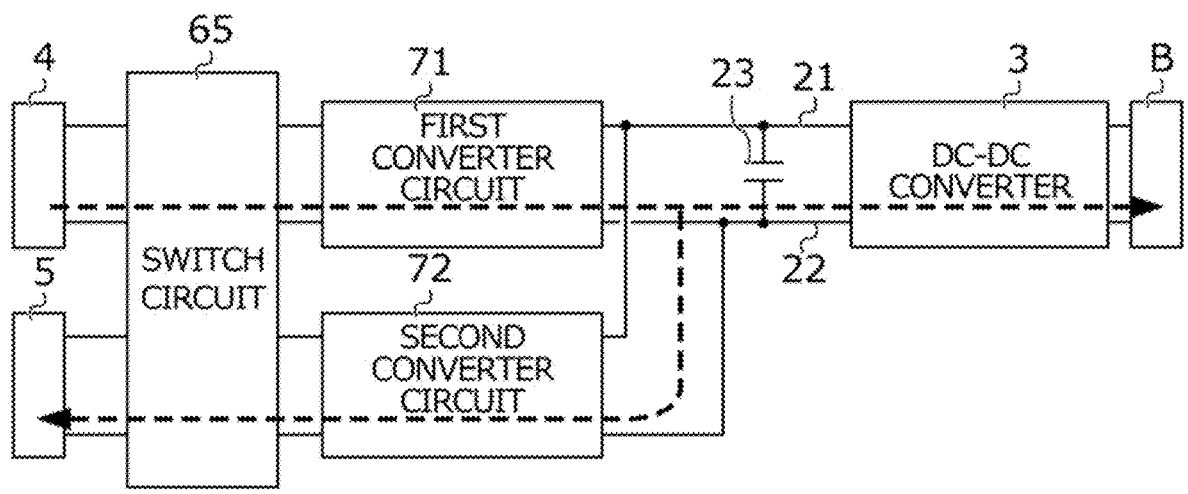
FIG. 4C is a diagram schematically illustrating a flow of electric power in a power feeding during charging mode.

FIG. 4C is a diagram schematically illustrating, with a broken line arrow, a flow of electric power at the time when the controllers 84 to 86 operate the power converter 6 and the DC-DC converter 3 under the power feeding during charging mode.

Under the power feeding during charging mode, the switch controller 84 operates the relays 66 and 67 of the switch circuit 65 and switches the switch circuit 65 to the second connection state. Accordingly, the first converter circuit 71 is connected to the power lines L1 and N1 of the inlet 4 and the second converter circuit 72 is connected to the power lines L4 and N2 of the outlet 5.

In order to implement the flow of the electric power illustrated in FIG. 4C and feed power to the external AC load EL while charging the high-voltage battery B, the power converter controller 85 operates the power converter 6 to thereby perform bulk voltage control and power feeding current control and, at the same time, the DC-DC converter controller 86 operates the DC-DC converter 3 to thereby perform charging current control.

More specifically, under the power feeding during charging mode, the power converter controller 85 causes the half PFC circuit configured by the first converter circuit 71 to operate as a PFC including the inlet 4 on an input side to thereby perform bulk voltage control and, at the same time, causes the second converter circuit 72 to operate as the inverter including the bulk capacitor 23 on an input side to thereby perform power feeding current control. More specifically, under the power feeding during charging mode, the power converter controller 85 operates the half PFC circuit such that the half PFC circuit operates as the PFC converter including the inlet 4 on the AC input side and including the bulk capacitor 23 on the DC output side. That is, the power converter controller 85 operates the half PFC circuit such that the AC power input from the external AC power supply EP connected to the inlet 4 is converted into DC power in the half PFC circuit and a power factor approaches one. At this time, the power converter controller 85 causes the half PFC circuit to operate as the PFC converter to thereby perform bulk voltage control for maintaining the voltage of the bulk capacitor 23 at a target voltage when power feeding during charging decided by not-illustrated processing.

The power converter controller 85 causes the second converter circuit 72 to operate as the inverter including the bulk capacitor 23 on the input side while causing the half PFC circuit to operate as the PFC converter as explained above to thereby convert the DC power in the bulk capacitor 23 into AC power and supplies the AC power to the external AC load EL. More specifically, under the power feeding during charging mode, the power converter controller 85 causes the second converter circuit 72 to operate as the inverter including the bulk capacitor 23 on the DC input side and including the outlet 5 on the AC output side to thereby perform the power feeding current control for the external AC load EL.

Under the power feeding during charging mode, the DC-DC converter controller 86 operates the DC-DC converter 3 such that the DC power in the bulk capacitor 23 is supplied to the high-voltage battery B. At this time, the DC-DC converter controller 86 operates the DC-DC converter 3 to thereby perform charging current control for maintaining the charging current supplied to the high-voltage battery B at a target charging current when power feeding during charging decided by not-illustrated processing.

Under the power feeding during charging mode, the controllers 84 to 86 operate the power converter 6 and the DC-DC converter 3 as explained above to thereby, while charging the high-voltage battery B with the AC power supplied from the external AC power supply EP connected to the inlet 4, convert the DC power in the bulk capacitor 23 into AC power and feed power to the external AC load EL connected to the outlet 5.

Referring back to FIG. 3, the operation state information acquirer 82 acquires, based on information transmitted from the controllers 84 to 86, operation state information indicating a current operation state of the power converter 6 and the DC-DC converter 3. The operation state information acquirer 82 transmits the acquired operation state information to the control mode determiner 83. The control mode determiner 83 can determine, by referring to the operation state information transmitted from the operation state information acquirer 82, whether the operation state of the power converter 6 and the DC-DC converter 3 is a state in which the power converter 6 and the DC-DC converter 3 are operating under the charging mode (hereafter referred to as "charging state"), a state in which the power converter 6 and the DC-DC converter 3 are operating under the power feeding mode (hereinafter referred to as "power feeding state"), a state in which the power converter 6 and the DC-DC converter 3 are operating under the power feeding during charging mode (hereinafter referred to as "power feeding during charging state"), or a stop state.

When a request for charging or power feeding is acquired by the charging/power feeding request acquirer 81, the control mode determiner 83 determines a control mode by the controllers 84 to 86 based on the operation state information transmitted from the operation state information acquirer 82 and a type of the acquired request.

Figure 5A:
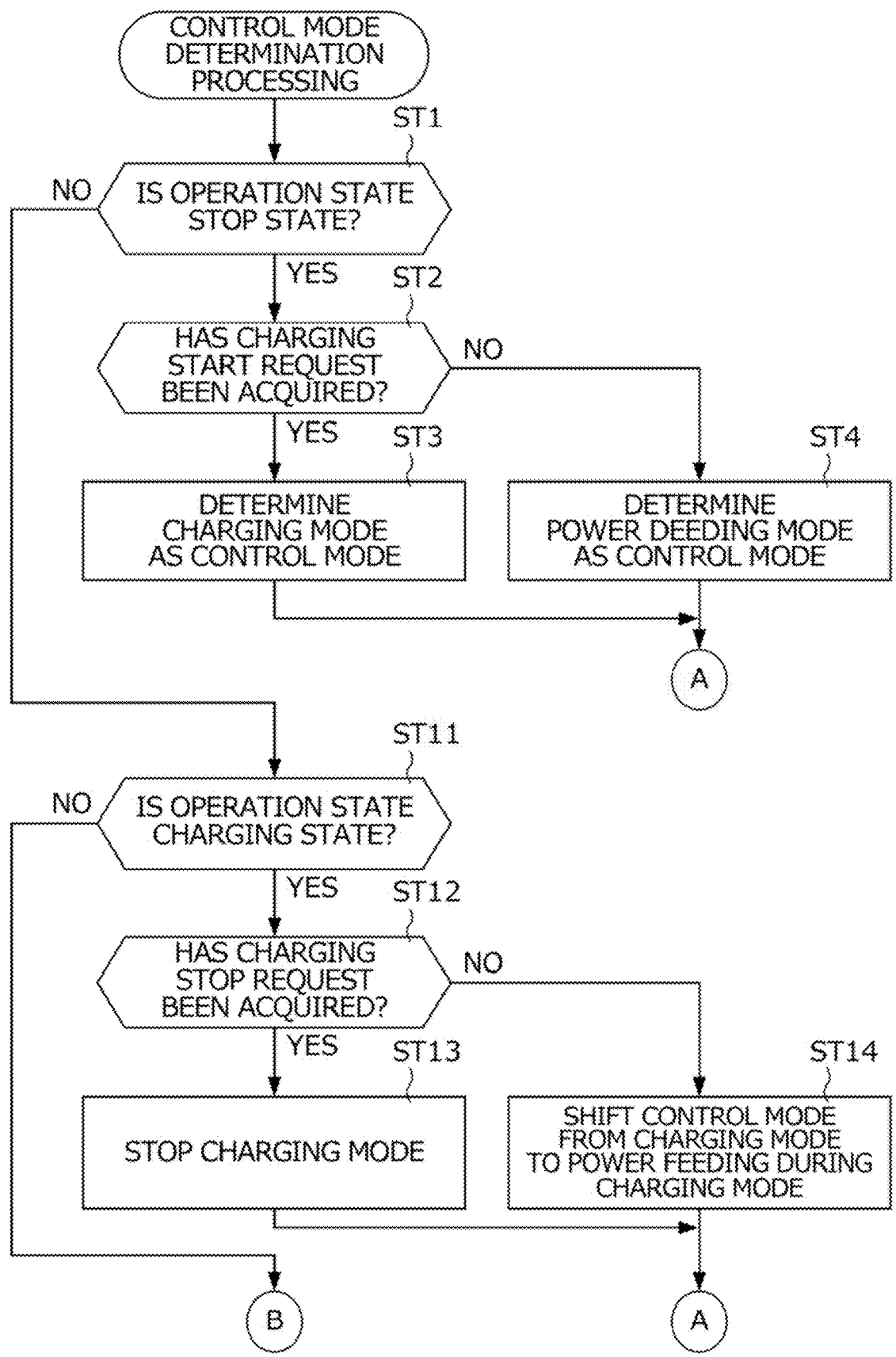
FIG. 5A is a flowchart illustrating a procedure of control mode determination processing (No. 1)
Figure 5B:
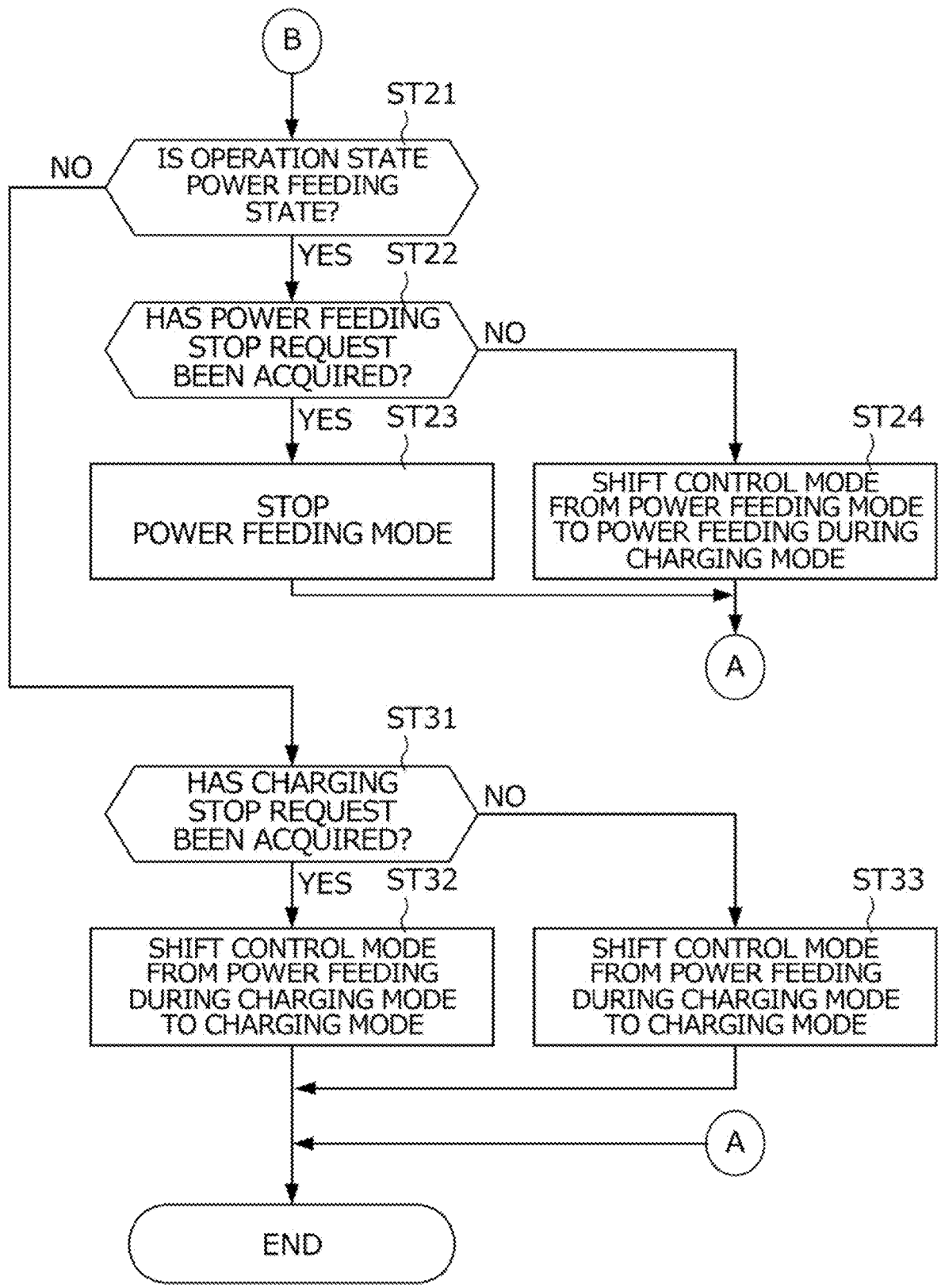
FIG. 5B is a flowchart illustrating the procedure of the control mode determination processing (No. 2)

FIGS. 5A and 5B are flowcharts illustrating a specific procedure of the control mode determination processing for determining a control mode in the control mode determiner 83. The control mode determination processing illustrated in FIGS. 5A and 5B is executed by the control mode determiner 83 at the opportunity when some request has been acquired by the charging/power feeding request acquirer 81.

First, in step ST1, the control mode determiner 83 determines, by referring to the operation state information, whether the current operation state is the stop state. When a determination result in step ST1 is YES, the control mode determiner 83 shifts to step ST2. When the determination result is NO, the control mode determiner 83 shifts to step ST11.

In step ST2, the control mode determiner 83 determines whether the request for starting charging has been acquired. When a determination result in step ST2 is YES, that is, when the request for starting charging has been acquired, the control mode determiner 83 shifts to step ST3. When the determination result in step ST2 is NO, that is, when a request for starting power feeding has been acquired, the control mode determiner 83 shifts to step ST4.

In step ST3, after determining the charging mode as the control mode, the control mode determiner 83 ends the control mode determination processing. Accordingly, the controllers 84 to 86 start operating the power converter 6 and the DC-DC converter 3 according to the procedure explained with reference to FIG. 4A. Accordingly, the operation state of the power converter 6 and the DC-DC converter 3 shifts from the stop state to the charging state.

In step ST4, after determining the power feeding mode as the control mode, the control mode determiner 83 ends the control mode determination processing. Accordingly, the controllers 84 to 86 start operating the power converter 6 and the DC-DC converter 3 according to the procedure explained with reference to FIG. 4B. Accordingly, the operation state of the power converter 6 and the DC-DC converter 3 shifts from the stop state to the power feeding state.

In step ST11, the control mode determiner 83 determines, by referring to the operation state information, whether the current operation state is the charging state. When a determination result in step ST11 is YES, the control mode determiner 83 shifts to step ST12. When the determination result is NO, the control mode determiner 83 shifts to step ST21.

In step ST12, the control mode determiner 83 determines whether the request for stopping charging has been acquired. When a determination result in step ST12 is YES, that is, when the request for stopping charging has been acquired, the control mode determiner 83 shifts to step ST13. When the determination result in step ST12 is NO, that is, when the request for starting power feeding has been acquired, the control mode determiner 83 shifts to step ST14.

In step ST13, after stopping the charging mode, the control mode determiner 83 ends the control mode determination processing. Accordingly, the controllers 84 to 86 stop operating the power converter 6 and the DC-DC converter 3. Accordingly, the operation state of the power converter 6 and the DC-DC converter 3 shifts from the charging state to the stop state.

In step ST14, after shifting the control mode from the charging mode to the power feeding during charging mode, the control mode determiner 83 ends the control mode determination processing. Accordingly, the controllers 84 to 86 start operating the power converter 6 and the DC-DC converter 3 according to the procedure explained with reference to FIG. 4C. Accordingly, the operation state of the power converter 6 and the DC-DC converter 3 shifts from the charging state to the power feeding during charging state.

In step ST21, the control mode determiner 83 determines, by referring to the operation state information, whether the current operation state is the power feeding state. When a determination result in step ST21 is YES, the control mode determiner 83 shifts to step ST22. When the determination result in step ST21 is NO, that is, when the current operation state is the power feeding during charging state, the control mode determiner 83 shifts to step ST31.

In step ST22, the control mode determiner 83 determines whether the request for stopping power feeding has been acquired. When a determination result in step ST22 is YES, that is, when the request for stopping power feeding has been acquired, the control mode determiner 83 shifts to step ST23. When the determination result in step ST22 is NO, that is, when the request for starting charging has been acquired, the control mode determiner 83 shifts to step ST24.

In step ST23, after stopping the power feeding mode, the control mode determiner 83 ends the control mode determination processing. Accordingly, the controllers 84 to 86 stop operating the power converter 6 and the DC-DC converter 3. Accordingly, the operation state of the power converter 6 and the DC-DC converter 3 shifts from the power feeding state to the stop state.

In step ST24, after shifting the control mode from the power feeding mode to the power feeding during charging mode, the control mode determiner 83 ends the control mode determination processing. Accordingly, the controllers 84 to 86 start operating the power converter 6 and the DC-DC converter 3 according to the procedure explained with reference to FIG. 4C. Accordingly, the operation state of the power converter 6 and the DC-DC converter 3 shifts from the power feeding state to the power feeding during charging state.

In step ST31, the control mode determiner 83 determines whether the request for stopping charging has been acquired. When a determination result in step ST31 is YES, that is, when the request for stopping charging has been acquired, the control mode determiner 83 shifts to step ST32. When the determination result in step ST31 is NO, that is, when the request for stopping power feeding has been acquired, the control mode determiner 83 shifts to step ST33.

In step ST32, after shifting the control mode from the power feeding during charging mode to the power feeding mode, the control mode determiner 83 ends the control mode determination processing. Accordingly, the controllers 84 to 86 start operating the power converter 6 and the DC-DC converter 3 according to the procedure explained with reference to FIG. 4B. Accordingly, the operation state of the power converter 6 and the DC-DC converter 3 shifts from the power feeding during charging state to the power feeding state.

In step ST33, after shifting the control mode from the power feeding during charging mode to the charging mode, the control mode determiner 83 ends the control mode determination processing. Accordingly, the controllers 84 to 86 start operating the power converter 6 and the DC-DC converter 3 according to the procedure explained with reference to FIG. 4A. Accordingly, the operation state of the power converter 6 and the DC-DC converter 3 shifts from the power feeding during charging state to the charging state.

Subsequently, an example of a control procedure for the power converter 6 and the DC-DC converter 3 by the control device 8 in a transition period at the time when the control mode is shifted is explained with reference to time charts illustrated in FIGS. 6A to 6D.

Figure 6A:
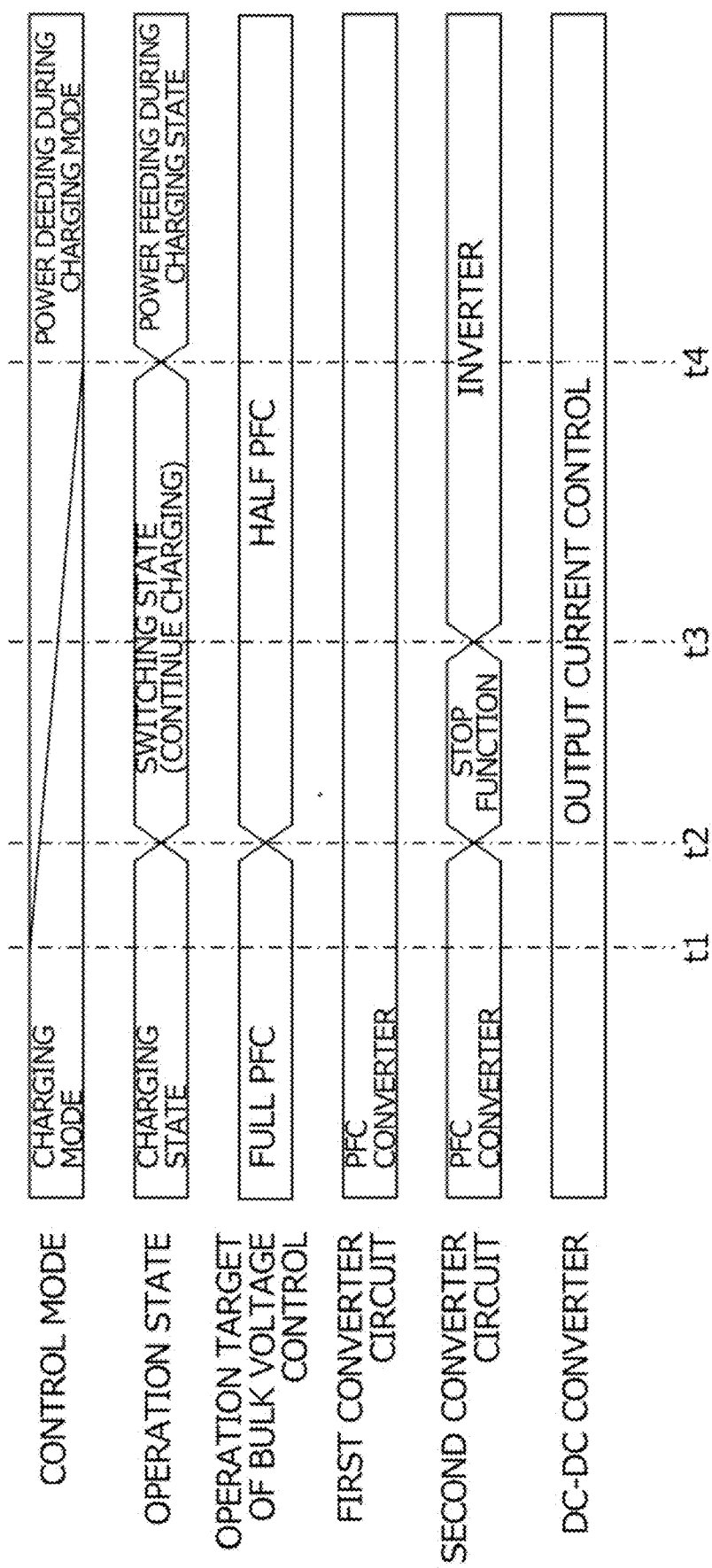
FIG. 6A is a time chart illustrating an example of a control procedure for a power converter and a DC-DC converter in a transition period at the time when a control mode is shifted from the charging mode to the power feeding during charging mode.

FIG. 6A is a time chart illustrating an example of a control procedure for the power converter 6 and the DC-DC converter 3 in a transition period at the time when the control mode is shifted from the charging mode to the power feeding during charging mode (see step ST14 in FIG. 5A). FIG. 6A illustrates a case in which the request for starting power feeding is acquired at time t1 during a period in which the high-voltage battery B is being charged under the charging mode.

In the example illustrated in FIG. 6A, the control mode determiner 83 starts to shift the control mode from the charging mode to the power feeding charging mode according to the request for starting power feeding being acquired at time t1. The control mode is the charging mode at a point in time when the request for starting power feeding is acquired at time t1. For this reason, at time t1, the power converter controller 85 causes the full PFC circuit configured by the first converter circuit 71 and the second converter circuit 72 to operate as the PFC converter to thereby perform bulk voltage control for maintaining the voltage of the bulk capacitor 23 at a predetermined target voltage when charging and the DC-DC converter controller 86 operates the DC-DC converter 3 to thereby perform charging current control for controlling an output current from the DC-DC converter 3 to the high-voltage battery B.

Thereafter, at time t2, while continuously causing the first converter circuit 71 to operate as the PFC converter, the power converter controller 85 stops the function of the second converter circuit 72, which has been caused to operate as the PFC converter. In other words, at time t2, the power converter controller 85 starts to cause the half PFC circuit configured by the first converter circuit 71 to operate as the PFC converter. That is, an operation target of the bulk voltage control is switched from the full PFC circuit to the half PFC circuit at time t2.

Thereafter, at time t3, while continuously causing the half PFC circuit to operate as the PFC converter, the power converter controller 85 starts to cause the second converter circuit 72 to operate as the inverter. Thereafter, at time t4, stable AC power starts to be supplied from the second converter circuit 72 operating as the inverter to the external AC load EL connected to the outlet 5. Accordingly, at time t4, the shift from the charging mode to the power feeding during charging mode is completed.

As explained above, when acquiring the request for starting power feeding during a period in which the high-voltage battery B is being charged under the charging mode, the control device 8 shifts the control mode from the charging mode to the power feeding during charging mode by starting to cause the second converter circuit 72 to operate as the inverter while continuously causing the first converter circuit 71 to operate as the PFC converter. Accordingly, at time t1 to t4, even while the operation state of the second converter circuit 72 is switched, it is possible to continue the charging to the high-voltage battery B without dropping the charging current to zero.

Figure 6B:
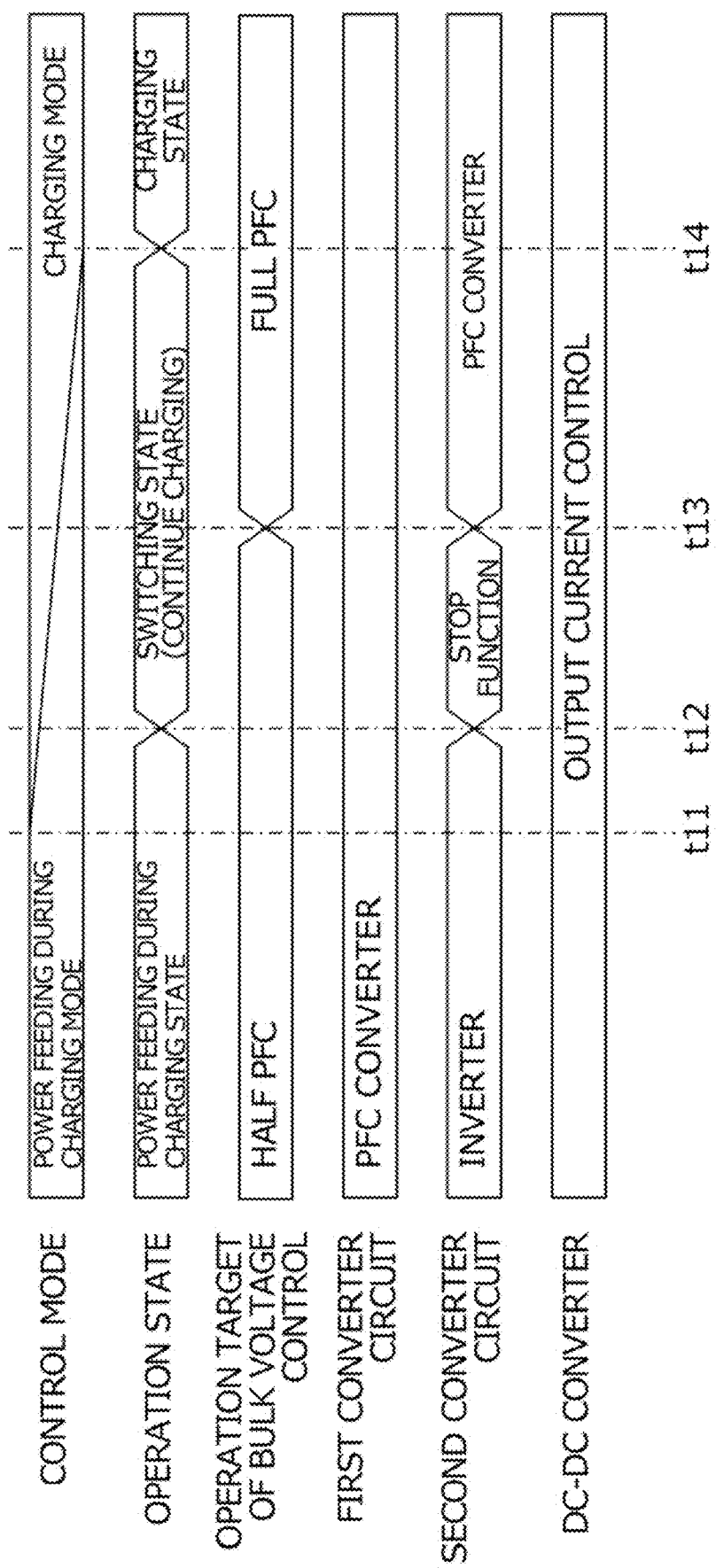
FIG. 6B is a time chart illustrating an example of a control procedure for the power converter and the DC-DC converter in a transition period at the time when the control mode is shifted from the power feeding during charging mode to the charging mode.

FIG. 6B is a time chart illustrating an example of a control procedure for the power converter 6 and the DC-DC converter 3 in a transition period at the time when the control mode is shifted from the power feeding during charging mode to the charging mode (see step ST33 in FIG. 5B). FIG. 6B illustrates a case in which, under the power feeding during charging mode, the request for stopping power feeding is acquired at time t11 during a period in which power is being fed to the external AC load EL while the high-voltage battery B is being charged.

In the example illustrated in FIG. 6B, the control mode determiner 83 shifts the control mode from the power feeding during charging mode to the charging mode according the request for stopping power feeding being acquired at time t11. The control mode is the power feeding during charging mode at a point in time when the request for stopping power feeding is acquired at time t11. For this reason, at time t11, the power converter controller 85 causes the half PFC circuit configured by only the first converter circuit 71 to operate as the PFC converter to thereby perform bulk voltage control for maintaining the voltage of the bulk capacitor 23 at a predetermined target voltage when power feeding during charging and the DC-DC converter controller 86 operates the DC-DC converter 3 to thereby perform charging current control for controlling an output current from the DC-DC converter 3 to the high-voltage battery B. At the same time, the power converter controller 85 causes the second converter circuit 72 to operate as the inverter to thereby perform the power feeding current control for the external AC load EL.

Thereafter, at time t12, while continuously causing the half PFC circuit to operate as the PFC converter, the power converter controller 85 stops the function of the second converter circuit 72, which has been caused to operate as the inverter. Accordingly, at time t12 and subsequent time, the power feeding to the external AC load EL stops.

Thereafter, at time t13, while continuously causing the first converter circuit 71 to operate as the PFC converter, the power converter controller 85 starts to cause the second converter circuit 72 to operate as the PFC converter. In other words, at time t13, the power converter controller 85 starts to cause the full PFC circuit configured by the first converter circuit 71 and the second converter circuit 72 to operate as the PFC converter. That is, an operation target of the bulk voltage control is switched from the half PFC circuit to the full PFC circuit at time t13. Thereafter, at time t14, control of the voltage of the bulk capacitor 23 stabilized by the full PFC circuit starts. Accordingly, at time t14, the shift from the power feeding during charging mode to the charging mode is completed.

As explained above, when the request for stopping power feeding is acquired during a period in which power is being fed to the external AC load EL while the high-voltage battery B is being charged under the power feeding during charging mode, the control device 8 shifts the control mode from the power feeding during charging mode to the charging mode by starting to cause the second converter circuit 72 to operate as the PFC converter while continuously causing the first converter circuit 71 to operate as the PFC converter. Accordingly, at time t11 to t14, even while the operation state of the second converter circuit 72 is switched, it is possible to continue the charging to the high-voltage battery B without dropping the charging current to zero.

Figure 6C:
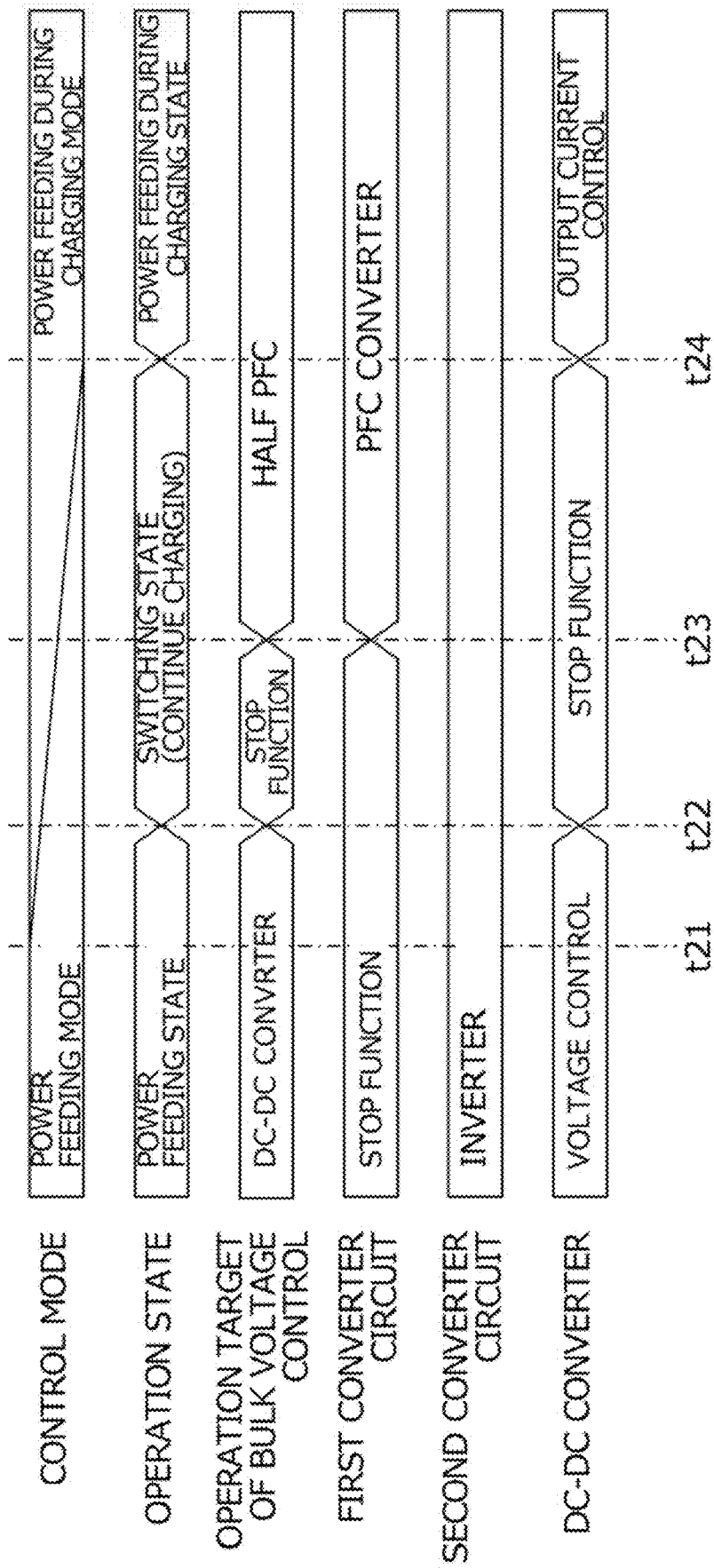
FIG. 6C is a time chart illustrating an example of a control procedure for the power converter and the DC-DC converter in a transition period at the time when the control mode is shifted from the power feeding mode to the power feeding during charging mode.

FIG. 6C is a time chart illustrating an example of a control procedure for the power converter 6 and the DC-DC converter 3 in a transition period at the time when the control mode is shifted from the power feeding mode to the power feeding mode during charging mode (see step ST24 in FIG. 5B). FIG. 6C illustrates a case in which the request for starting charging is acquired at time t21 during a period in which power is being fed to the external AC load EL under the power feeding mode.

In the example illustrated in FIG. 6C, the control mode determiner 83 starts to shift the control mode from the power feeding mode to the power feeding during charging mode according to the request for starting charging being acquired at time t21. The control mode is the power feeding mode at a point in time when the request for starting charging is acquired at time t21. Accordingly, at time t21, the DC-DC converter controller 86 operates the DC-DC converter 3 to thereby perform bulk voltage control for maintaining the voltage of the bulk capacitor 23 at a predetermined target voltage when power feeding and the power converter controller 85 causes the second converter circuit 72 to operate as the inverter to thereby perform power feeding current control for the external AC load EL.

Thereafter, at time t22, while the power converter controller 85 continuously causes the second converter circuit 72 to operate as the inverter, the DC-DC converter controller 86 stops the function of the DC-DC converter 3 in order to shift the operation target of the bulk voltage control from the DC-DC converter 3 to the half PFC circuit. Accordingly, although the voltage of the bulk capacitor 23 starts to drop from the target voltage when power feeding, it is possible to temporarily continue the power feeding to the external AC load EL with electric charges stored in the bulk capacitor 23.

Thereafter, at time t23, while continuously causing the second converter circuit 72 to operate as the inverter, the power converter controller 85 starts to cause the half PFC circuit (that is, the first converter circuit 71), which has been stopped, to operate as the PFC converter. More specifically, the power converter controller 85 operates the half PFC circuit to thereby start the bulk voltage control for controlling the voltage of the bulk capacitor 23. Accordingly, the voltage of the bulk capacitor 23 starts to rise toward the predetermined target voltage when power feeding during charging.

Thereafter, at time t24, according to the voltage of the bulk capacitor 23 having risen to the target voltage when power feeding during charging, the DC-DC converter controller 86 operates the DC-DC converter 3 to thereby start charging current control for the high-voltage battery B. Accordingly, at time t24, charging to the high-voltage battery B is started and the shift from the power feeding mode to the power feeding during charging mode is completed.

As explained above, when the request for starting charging is acquired during a period in which the power is being fed to the external AC load EL under the power feeding mode, the control device 8 shifts the control mode from the power feeding mode to the power feeding during charging mode by starting to cause the first converter circuit 71 to operate as the PFC converter while continuously causing the second converter circuit 72 to operate as the inverter. Accordingly, at time t21 to t24, even while the operation state of the DC-DC converter 3 and the first converter circuit 71 is switched, it is possible to continue the power feeding to the external AC load EL without dropping the power feeding power to the external AC load EL to zero.

Figure 6D:
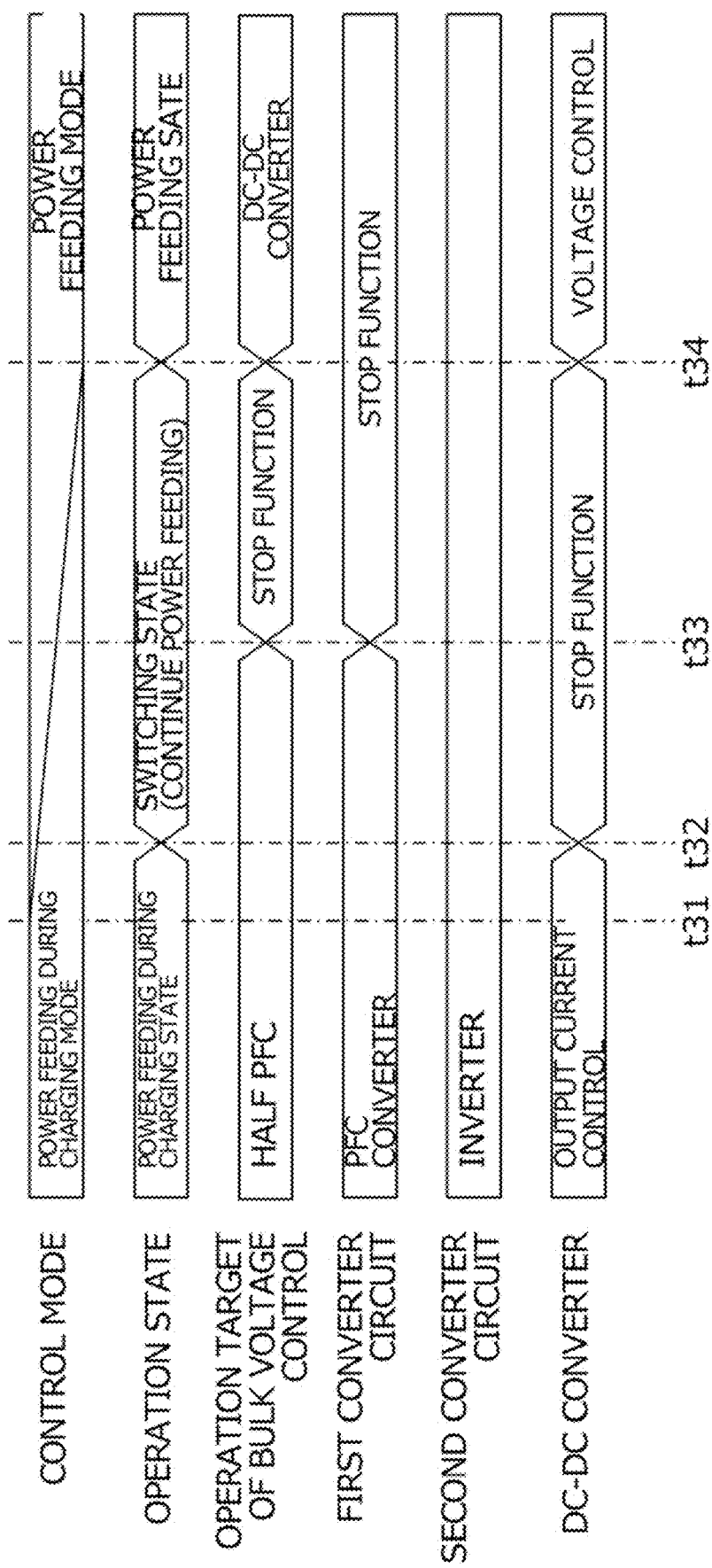
FIG. 6D is a time chart illustrating an example of a control procedure for the power converter and the DC-DC converter in a transition period at the time when the control mode is shifted from the power feeding during charging mode to the power feeding mode.

FIG. 6D is a time chart illustrating an example of a control procedure for the power converter 6 and the DC-DC converter 3 in a transition period at the time when the control mode is shifted from the power feeding during charging mode to the charging mode (see step ST32 in FIG. 5B). FIG. 6D illustrates a case in which the request for stopping charging is acquired at time t31 during a period in which power is being fed to the external AC load EL while the high-voltage battery B is being charged.

In the example illustrated in FIG. 6D, the control mode determiner 83 starts to shift the control mode from the power feeding during charging mode to the power feeding mode according to the request for stopping charging being acquired at time t31. The control mode is the power feeding during charging mode at a point in time when the request for stopping charging is acquired at time t31. Accordingly, at time t31, the power converter controller 85 causes the half PFC circuit configured by only the first converter circuit 71 to operate as the PFC converter to thereby perform the bulk voltage control for maintaining the voltage of the bulk capacitor 23 at the predetermined target voltage when power feeding during charging and the DC-DC converter controller 86 operates the DC-DC converter 3 to thereby perform the charging current control for the high-voltage battery B. At the same time, the power converter controller 85 causes the second converter circuit 72 to operate as the inverter to thereby perform the power feeding current control for the external AC load EL.

Thereafter, at time t32, while the power converter controller 85 continuously causes the second converter circuit 72 to operate as the inverter, the DC-DC converter controller 86 stops the function of the DC-DC converter 3. Accordingly, the charging to the high-voltage battery B stops.

Thereafter, at time t33, while continuously causing the second converter circuit 72 to operate as the inverter, the power converter controller 85 stops the function of the half PFC circuit in order to shift the operation target of the bulk voltage control from the half PFC circuit to the DC-DC converter 3. Accordingly, although the voltage of the bulk capacitor 23 starts to drop from the target voltage when power feeding, it is possible to temporarily continue the power feeding to the external AC load EL with electric charges stored in the bulk capacitor 23.

Thereafter, at time t34, the DC-DC converter controller 86 operates the DC-DC converter 3 to thereby start the bulk voltage control. Accordingly, at time t34, the shift from the power feeding during charging mode to the power feeding mode is completed.

As explained above, when the request for stopping charging is acquired during a period in which the power is being fed to the external AC load EL while the high-voltage battery B is being charged under the power feeding during charging mode, the control device 8 shifts the control mode from the power feeding during charging mode to the power feeding mode by stopping the operation of the first converter circuit 71 while continuously causing the second converter circuit 72 to operate as the inverter. Accordingly, at time t31 to t34, even while the operation state of the DC-DC converter 3 and the first converter circuit 71 is switched, it is possible to continue the power feeding to the external AC load EL without dropping the power feeding power to the external AC load EL to zero.

With the power system 1 according to the present embodiment, the following effects are achieved.

(1) The power converter 6 of the power system 1 includes the first converter circuit 71 including the two switching legs 61 and 64, the second converter circuit 72 including the two switching legs 62 and 63, and the switch circuit 65 capable of switching a connection state between the converter circuits 71 and 72 and the inlet 4 and the outlet 5. Under the charging mode, the control device 8 connects both of the converter circuits 71 and 72 to the inlet 4 by switching the switch circuit 65 to the first connection state and charges the high-voltage battery B with the external AC power supply EP connected to the inlet 4 by causing the converter circuits 71 and 72 to operate as the PFC converter including the inlet 4 on the input side. Under the power feeding mode, the control device 8 connects the converter circuits 71 and 72 respectively to the inlet 4 and the outlet 5 by switching the switch circuit 65 to the second connection state and feeds power to the external AC load EL connected to the outlet 5 by causing the second converter circuit 72 to operate as the inverter including the bulk capacitor 23 on the input side. Under the power feeding during charging mode, the control device 8 can feed power to the external AC load EL while charging the high-voltage battery B by switching the switch circuit 65 to the second connection state and causing the first converter circuit 71 to operate as the PFC converter and causing the second converter circuit 72 to operate as the inverter. As explained above, with the power system 1, when power feeding and when power feeding during charging, only the second converter circuit 72 of the converter circuits 71 and 72 caused to operate as the PFC converter when charging is caused to operate as the inverter. Thus, with the power system 1, it is possible to perform charging, power feeding, and power feeding during charging using the common power converter 6. Therefore, compared with when charging and power feeding are respectively performed using separate units, it is possible to reduce cost and contribute to energy efficiency.

(2) With the power system 1, when a request for charging by the external AC power supply EP or power feeding to the external AC load EL is acquired, the control mode by the control device 8 is determined based on the operation state information of the converter circuits 71 and 72 and a type of the acquired request. Thus, with the power system 1, it is possible to shift to an appropriate control mode corresponding to the operation state of the converter circuits 71 and 72 at the time when the request is acquired. Therefore, it is possible to shift to a new control mode while continuing a charging operation and a power feeding operation performed before the request is acquired.

(3) With the power system 1, under the power feeding during charging mode, by controlling the voltage of the bulk capacitor 23 by causing the first converter circuit 71 to operate as the PFC converter, the control device 8 can maintain the voltage of the bulk capacitor 23 at a voltage decided in order to simultaneously perform charging to the high-voltage battery B and power feeding to the external AC load EL.

(4) With the power system 1, under the charging mode, by controlling the voltage of the bulk capacitor 23 by causing the converter circuits 71 and 72 to operate as the PFC converter, the control device 8 can maintain the voltage of the bulk capacitor 23 at a voltage decided in order to perform the charging to the high-voltage battery B. With the power system 1, by causing both of the converter circuits 71 and 72 to operate as the PFC converter, it is possible to charge the high-voltage battery B at higher efficiency in a high load region than when only the first converter circuit 71 is caused to operate as the PFC converter.

(5) With the power system 1, when the request for starting power feeding is acquired during a period in which the high-voltage battery B is being charged, while continuously causing the first converter circuit 71 to operate as the PFC converter, the control device 8 shifts the control mode from the charging mode to the power feeding during charging mode by starting to cause the second converter circuit 72, which has been caused to operate as the PFC converter, to operate as the inverter. Accordingly, it is possible to start the power feeding to the external AC load EL without dropping a charging current to the high-voltage battery B to zero.

(6) With the power system 1, when the request for stopping power feeding is acquired during a period in which power is being fed to the external AC load EL while the high-voltage battery B is being charged, while continuously causing the first converter circuit 71 to operate as the PFC converter, the control device 8 shifts the control mode from the power feeding during charging mode to the charging mode by starting to cause the second converter circuit 72, which has been caused to operate as the inverter, to operate as the PFC converter. Accordingly, it is possible to stop the power feeding to the external AC load EL without dropping the charging current to the high-voltage battery B to zero.

(7) With the power system 1, under the power feeding mode, the control device 8 controls the voltage of the bulk capacitor 23 by operating the power converter 6 and converts the DC power in the bulk capacitor 23 into AC power by causing the second converter circuit 72 to operate as the inverter and supplies the AC power to the external AC load EL. Thus, with the power system 1, it is possible to maintain the voltage of the bulk capacitor 23 at a voltage decided in order to perform power feeding to the external AC load EL.

(8) With the power system 1, when the request for starting charging is acquired during a period in which power is being fed to the external AC load EL, while continuously causing the second converter circuit 72 to operate as the inverter, the control device 8 shifts the control mode from the power feeding mode to the power feeding during charging mode by starting to cause the first converter circuit 71, which has stopped operation, to operate as the PFC converter. Accordingly, it is possible to start charging to the high-voltage battery B while continuing supply of electric power to the external AC load EL.

(9) With the power system 1, when the request for stopping charging is acquired during a period in which power is being fed to the external AC load EL while the high-voltage battery B is being charged, while continuously causing the second converter circuit 72 to operate as the inverter, the control device 8 shifts the control mode from the power feeding during charging mode to the power feeding mode by stopping operation of the first converter circuit 71, which has been caused to operate as the PFC converter. Accordingly, it is possible to stop charging to the high-voltage battery B while continuing supply of electric power to the external AC load EL.

The embodiment of the present invention is explained above. However, the present invention is not limited to the embodiment. The detailed configuration may be changed as appropriate within the scope of the gist of the present invention.

For example, in the embodiment explained above, the four switching legs 61 to 64 in total are included in the power converter 6, the first converter circuit 71 is configured by the two switching legs 61 and 64, and the second converter circuit 72 is configured by the two switching legs 62 and 63. However, the present invention is not limited to this. The first converter circuit 71 may be configured by two or more switching legs. The second converter circuit 72 may be configured by one or more switching legs. Note that, even when the number of switching legs configuring the second converter circuit 72 is one, it is preferable that another leg is a rectifier circuit.

In the embodiment explained above, the case in which the single-phase two-line type external AC power supply EP is connected to the inlet 4 is mainly explained. However, the present invention is not limited to this. As explained with reference to FIG. 2, the three-phase four-line type external AC power supply EP' may be connected to the inlet 4. At this time, when the three voltage lines EL1, EL2, and EL3 and the neutral line EN of the external AC power supply EP' are respectively connected to the power lines L1, L2, L3, and N1, under the charging mode, three-phase AC power can be supplied to the power converter 6 to charge the high-voltage battery B. However, under the power feeding during charging mode, while the three-phase AC power is supplied to the power converter 6, power cannot be simultaneously fed to the external AC load EL. However, under the power feeding during charging mode, by using only the two power lines L1 and N1, it is possible to simultaneously feed power to the external AC load EL while supplying the single-phase AC power from the external AC power supply EP' to the power converter 6.

What is claimed is:
1. A mobile body power system comprising:
a voltage converter connected to an electrical storage device;
a power converter connected to an inlet and an outlet;
a capacitor included in a power line that connects the voltage converter and the power converter; and
a control device configured to operate the voltage converter and the power converter, wherein
the power converter includes:
a first converter circuit including two or more switching legs connected to the power line;

a second converter circuit including one or more switching legs connected to the power line to be parallel to the first converter circuit; and a switch circuit that is switchable between a first connection state in which both of the first and second converter circuits are connected to the inlet and a second connection state in which the first and second converter circuits are respectively connected to the inlet and the outlet, the control device operates the voltage converter and the power converter under any one control mode among a charging mode for charging the electrical storage device with an external power supply connected to the inlet by switching the switch circuit to the first connection state and causing the first and second converter circuits to operate as a power factor correction (PFC) converter including the inlet on an input side, a power feeding mode for feeding power to an external load connected to the outlet by switching the switch circuit to the second connection state and causing the second converter circuit to operate as an inverter including the capacitor on the input side, and a power feeding during charging mode for feeding power to the external load while charging the electrical storage device by switching the switch circuit to the second connection state and causing the first converter circuit to operate as the PFC converter and causing the second converter circuit to operate as the inverter.

2. The mobile body power system according to claim 1, comprising:
an operation state information acquirer configured to acquire operation state information of the first and second converter circuits;
a request acquirer configured to acquire a request for charging by the external power supply or power feeding to the external load; and
a control mode determiner configured to, when the request is acquired, determine the control mode based on the operation state information and a type of the request.

3. The mobile body power system according to claim 1, wherein, under the power feeding during charging mode, the control device controls a voltage of the capacitor by causing the first converter circuit to operate as the PFC converter.

4. The mobile body power system according to claim 3, wherein, under the charging mode, the control device controls the voltage of the capacitor by causing the first and second converter circuits to operate as the PFC converter.

5. The mobile body power system according to claim 4, further comprising a request acquirer configured to acquire a request for starting power feeding to the external load or a request for starting charging by the external power supply, wherein when the request for starting power feeding is acquired during a period in which the electrical storage device is being charged, the control device shifts the control mode from the charging mode to the power feeding during charging mode by starting to cause the second converter circuit to operate as the inverter while continuously causing the first converter circuit to operate as the PFC converter.

6. The mobile body power system according to claim 4, further comprising a request acquirer configured to acquire a request for stopping power feeding to the external load or a request for stopping charging by the external power supply, wherein when the request for stopping power feeding is acquired during a period in which power is being fed to the external load while the electrical storage device is being charged, the control device shifts the control mode from the power feeding during charging mode to the charging mode by starting to cause the second converter circuit to operate as the PFC converter while continuously causing the first converter circuit to operate as the PFC converter.

7. The mobile body power system according to claim 3, wherein, under the power feeding mode, the control device controls a voltage of the capacitor by operating the voltage converter and converts DC power in the capacitor into AC power by causing the second converter circuit to operate as the inverter and supplies the AC power to the external load.

8. The mobile body power system according to claim 7, further comprising a request acquirer configured to acquire a request for starting power feeding to the external load and a request for starting charging by the external power supply, wherein when the request for starting charging is acquired during a period in which power is being fed to the external load, the control device shifts the control mode from the power feeding mode to the power feeding during charging mode by starting to cause the first converter circuit to operate as the PFC converter while continuously causing the second converter circuit to operate as the inverter.

9. The mobile body power system according to claim 7, further comprising a request acquirer configured to acquire a request for stopping power feeding to the external load or a request for stopping charging by the external power supply, wherein when the request for stopping charging is acquired during a period in which power is being fed to the external load while the electrical storage device is being charged, the control device shifts the control mode from the power feeding during charging mode to the power feeding mode by stopping an operation of the first converter circuit while continuously causing the second converter circuit to operate as the inverter.

* * * * *